US010789486B2

(12) United States Patent
Rössler et al.

(10) Patent No.: US 10,789,486 B2
(45) Date of Patent: Sep. 29, 2020

(54) METHOD AND DEVICE FOR THE AUTOMATED DRIVING OF A MOTOR VEHICLE

(71) Applicant: VOLKSWAGEN AKTIENGESELLSCHAFT, Wolfsburg (DE)

(72) Inventors: Bernd Rössler, Sassenburg (DE); Simon Grossjohann, Wolfsburg (DE); Kai Homeier, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 215 days.

(21) Appl. No.: 15/775,057

(22) PCT Filed: Nov. 9, 2016

(86) PCT No.: PCT/EP2016/077130
§ 371 (c)(1),
(2) Date: May 10, 2018

(87) PCT Pub. No.: WO2017/092991
PCT Pub. Date: Jun. 8, 2017

(65) Prior Publication Data
US 2018/0341819 A1    Nov. 29, 2018

(30) Foreign Application Priority Data
Dec. 2, 2015   (DE) .................. 10 2015 224 008

(51) Int. Cl.
*G06K 9/00*     (2006.01)
*B62D 15/02*    (2006.01)
(Continued)

(52) U.S. Cl.
CPC ... *G06K 9/00798* (2013.01); *B60W 30/18163* (2013.01); *B62D 15/0255* (2013.01);
(Continued)

(58) Field of Classification Search
CPC .......... G06K 9/00798; G06K 9/00785; B60W 30/12
See application file for complete search history.

(56) References Cited

U.S. PATENT DOCUMENTS 9,063,548 B1 * 6/2015 Ferguson ........... G06K 9/00798
9,081,385 B1 * 7/2015 Ferguson ........... G06K 9/00798
(Continued)

FOREIGN PATENT DOCUMENTS

CN    104228827 A    12/2014
DE    19737415 A1    3/1998
(Continued)

OTHER PUBLICATIONS

Search Report for German Patent Application No. 10 2015 224 008.8; dated Jul. 14, 2016.
(Continued)

*Primary Examiner* — Sarah B McPartlin
(74) *Attorney, Agent, or Firm* — Barnes & Thornburg LLP

(57) ABSTRACT

A method and device for the automated driving of a motorized transportation vehicle having at least one camera and an evaluation unit for evaluating the data captured by the camera, wherein lane markings are captured by the camera and the evaluation unit determines traffic lanes from the captured data of the camera, wherein the evaluation unit observes changes in the lane markings which will cause a new traffic lane to be determined over a predefined distance,
(Continued)

wherein the new traffic lane is adopted only in response to the changed lane marking being captured over the predefined distance.

9 Claims, 1 Drawing Sheet

(51) Int. Cl.
  *B60W 30/18* (2012.01)
  *G05D 1/00* (2006.01)
(52) U.S. Cl.
  CPC ....... *G05D 1/0088* (2013.01); *B60W 2420/42* (2013.01); *B60W 2552/00* (2020.02); *G05D 2201/0213* (2013.01)

(56) References Cited

U.S. PATENT DOCUMENTS

| | | |
|---|---|---|
| 9,120,486 B1 | 9/2015 | Mallinger |
| 2004/0201672 A1 | 10/2004 | Varadarajan et al. |
| 2008/0061952 A1 | 3/2008 | Maass |
| 2010/0138115 A1* | 6/2010 | Kageyama .......... B60R 21/0134 |
| | | 701/46 |
| 2010/0228420 A1 | 9/2010 | Lee |
| 2012/0242479 A1 | 9/2012 | Ghazarian et al. |
| 2014/0129073 A1 | 5/2014 | Ferguson |
| 2015/0325127 A1* | 11/2015 | Pandita .................... G08G 1/16 |
| | | 701/431 |
| 2016/0140401 A1* | 5/2016 | Ishigami ............... B60W 30/10 |
| | | 348/148 |

FOREIGN PATENT DOCUMENTS

| | | |
|---|---|---|
| DE | 102004040143 A1 | 2/2006 |
| DE | 102004052127 A1 | 5/2006 |
| DE | 102013019112 A1 | 5/2015 |
| DE | 102013019196 A1 | 5/2015 |
| EP | 2253936 A1 | 11/2010 |
| GB | 2515355 A | 12/2014 |
| JP | 2009214787 A | 9/2009 |
| JP | 2012118027 A | 6/2012 |
| WO | 2009155228 A1 | 12/2009 |

OTHER PUBLICATIONS

Search Report for International Patent Application No. PCT/EP2016/077130; dated Jan. 31, 2017.

\* cited by examiner

METHOD AND DEVICE FOR THE AUTOMATED DRIVING OF A MOTOR VEHICLE

PRIORITY CLAIM

This patent application is a U.S. National Phase of International Patent Application No. PCT/EP2016/077130, filed 9 Nov. 2016, which claims priority to German Patent Application No. 10 2015 224 008.8, filed 2 Dec. 2015, the disclosures of which are incorporated herein by reference in their entireties.

SUMMARY

Illustrative embodiments relate to a method and a device for the automated driving of a motorized transportation vehicle.

BRIEF DESCRIPTION OF THE DRAWINGS

The disclosed embodiments are explained below in more detail with reference to the figures, in which.

DETAILED DESCRIPTION

Figure 1:
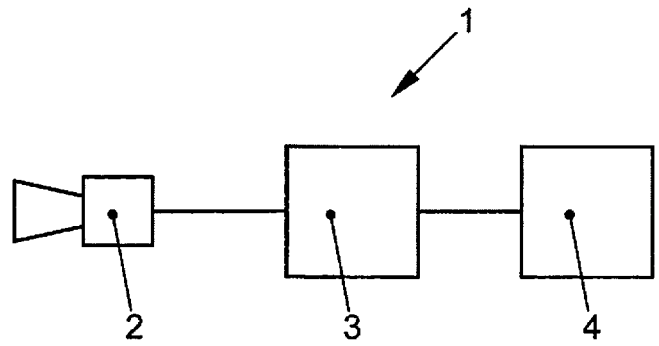
FIG. 1 shows a schematic block diagram of a device for the automated driving of a motorized transportation vehicle.

A method and/or a device for the automated driving of a motorized transportation vehicle is known, for example, from US 2010/0228420 A1. The device here comprises a camera and an evaluation unit for evaluating the data acquired by the camera. Lane markings are here acquired by the camera and traffic lanes are determined from them. With reference to the motorized transportation vehicle's own position in relation to the traffic lane, the motorized transportation vehicle can then be centered in the traffic lane through automatic steering commands, or an automated lane change into a neighboring traffic lane can also be performed.

Disclosed embodiments provide a method for the automated driving of a motorized transportation vehicle available with which the risk of erroneous lane changes is reduced. A further technical problem is the creation of a device for automated driving.

The method for the automated driving of a motorized transportation vehicle is achieved by at least one camera and an evaluation unit for evaluating the data acquired by the camera, wherein lane markings are acquired by the camera, and traffic lanes are determined from them. Changes in the lane markings that would lead to the determination of a new traffic lane are observed here over a predefined distance, wherein the new traffic lane is adopted only if the changed lane marking has been acquired over the predefined distance. In this way it is ensured that a new traffic lane is only adopted when it has been acquired for sufficiently long. In this way, the possibility that, for example, brief malfunctions of the camera or damage to the lane markings do not lead to false traffic lane acquisitions is avoided. The distance here represents the product of transportation vehicle speed and time, so that the adoption takes place more rapidly at higher speeds. It is to be noted here that the change in the acquired lane marking can, for example, consist in that a previously solid or dashed lane marking has disappeared, or that a solid lane marking has become a dashed lane marking or vice versa. It is further to be noted that, in addition to the camera, further sensor systems such as, for example, radar or lidar sensor systems can be present. A digital roadmap can also furthermore be present. A new traffic lane can, however, be determined reliably by the method, even if the other sensor systems or the digital roadmap fail.

It can be provided here that the distance for the adoption of a traffic lane is chosen differently for a left-hand and a right hand traffic lane. In the case of driving on the right, the distance for a traffic lane on the right is chosen to be greater than for the traffic lane on the left, since the risk of false acquisitions is greater there, which will be explained in more detail below.

In a further disclosed embodiment, the distance is chosen to be greater than the length of a temporary traffic lane. A temporary traffic lane here refers to an entrance and exit or to a freeway intersection. A temporary traffic lane (deceleration lane) is formed here at a certain distance of, for example, about 300-500 m, onto which it is necessary to change when the motorized transportation vehicle wants to exit. Since the length of the temporary traffic lane can be different according to the country, the distance must be appropriately adjusted (e.g., by GPS data) or chosen to be correspondingly large, for example, in that the distance is chosen to be greater than the maximum length of a temporary traffic lane. This prevents the motorized transportation vehicle, in the event of automated driving, from erroneously changing to the temporary traffic lane as a result of an option to turn right, and exiting at an unwanted place.

It can further be provided that the distance is chosen depending on the type of lane marking acquired. The distance can, for example, be chosen to be smaller in the case of solid lane markings, since the risk of false acquisitions is lower. It can further be provided, particularly in the case of the left-hand traffic lane, that the distance is also reduced when other motorized transportation vehicles are also acquired.

In a further disclosed embodiment, changes in the lane markings that would lead to the deletion of a traffic lane are again observed over a predefined distance, wherein the traffic lane is only deleted if the changed lane marking has been acquired over the predefined distance. The distance can here be chosen to be equal to the distance for a new traffic lane. Optionally, however, the distance for the deletion of a traffic lane is chosen to be shorter.

In a further disclosed embodiment, the distance for the deletion is chosen depending on the type of previously and/or currently acquired lane marking. The distance is, for example, longer if a solid lane marking has previously been acquired.

In a further disclosed embodiment, previously determined traffic lanes remain stored at a traffic lane change of the motorized transportation vehicle. It is thus possible that, for example, although it can only acquire the traffic lane of the neighboring traffic lane, a motorized transportation vehicle knows that it is located on a three-lane freeway, when it changes from a right-hand lane to a lane on the far left.

A field of application of the method is automated driving with lane changes on a freeway.

In terms of the device, reference is made to the full content of the above explanations of the method.

A block diagram of a device 1 for automated driving of a motorized transportation vehicle is schematically illustrated in FIG. 1, having at least one camera 2, an evaluation unit 3 and an actuator system 4 driven by the evaluation unit 3. The at least one camera 2 is aligned in the direction of travel of the motorized transportation vehicle, and has an acquisition range to acquire at least lane markings to the left and right of the motorized transportation vehicle. This acquired data from the camera 2 is then evaluated by the evaluation unit 3 to determine traffic lanes. The device 1 is here designed such that it learns its surroundings, i.e., the device 1 autonomously learns new traffic lanes and/or forgets traffic lanes from the data of the camera 2. The evaluation unit 3 is here designed such that changes in the lane markings that would lead to the determination of a new traffic lane are observed over a predefined distance, wherein the new traffic lane is adopted only if the changed lane marking has been acquired over the predefined distance. This predefined distance can be referred to as dgrenz1.

Figure 2:
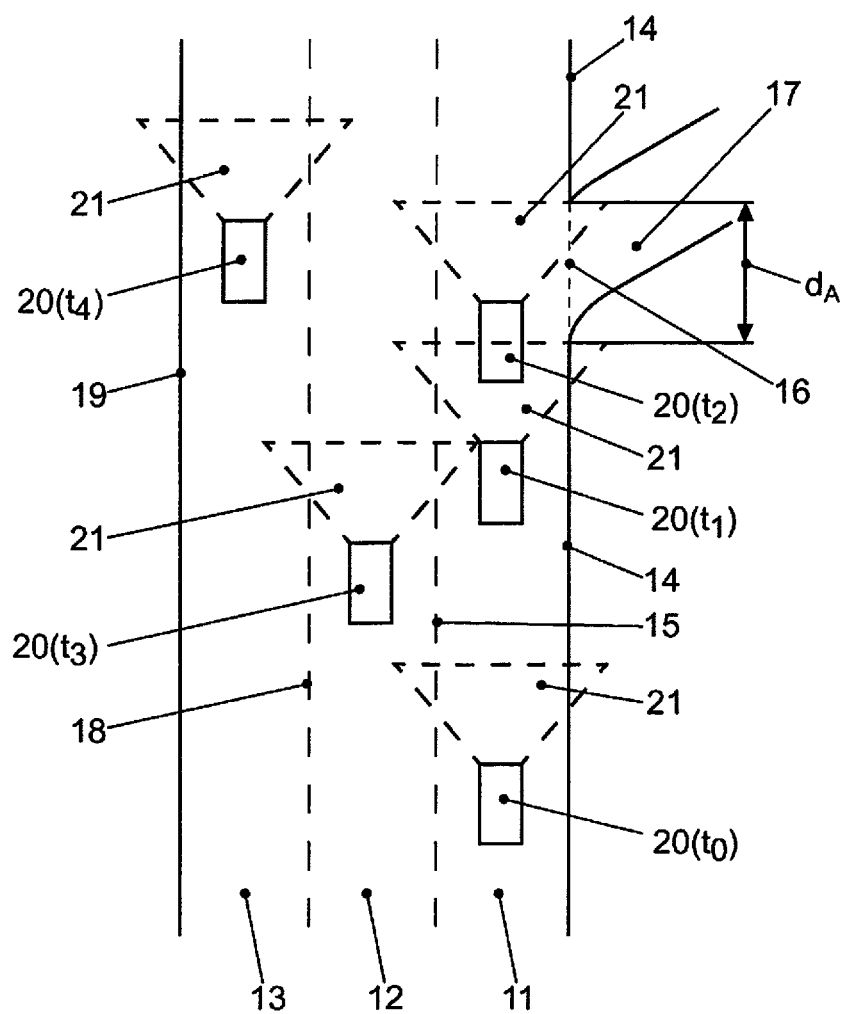
FIG. 2 shows a schematic illustration of a freeway exit.

This is now to be explained in more detail by way of example with reference to FIG. 2. A three-lane freeway with the three traffic lanes 11, 12, 13 is illustrated. A motorized transportation vehicle 20 is at the time t0 located on the right-hand lane 11. The camera 2 of the device 1 (see FIG. 1) acquires the solid lane marking 14 on the right and the dashed lane marking 15 on the left. The acquisition range 21 of the camera is here illustrated by dashes. The evaluation unit 3 can derive from this information the fact that at least two traffic lanes 11, 12 exist, its own traffic lane 11 being the right-hand traffic lane (due to the solid line). If the motorized transportation vehicle 20 now continues to drive straight ahead on the traffic lane 11, the camera 2, or the evaluation unit 3, acquires at time t1 a change to the right-hand lane marking 14 into a dashed lane marking 16. The device 1 does not yet know whether this is a permanent new traffic lane or whether it is a temporary traffic lane (a freeway exit, for example). The new traffic lane 17 is therefore not initially adopted. Rather, the evaluation unit 3 observes, for the predefined distance dgrenz1, whether the dashed lane marking 16 continues to be recognized. At time t2 the motorized transportation vehicle 20 has covered a distance dA smaller than the predefined distance dgrenz1, and the camera 2 again acquires the solid lane marking 14. The new traffic lane 17 is therefore classified as a temporary traffic lane, and is not adopted.

The predefined distance can here be dependent on the acquired lane marking, so that, for example, the predefined distance dgrenz2 for a newly acquired solid lane marking is smaller than dgrenz1.

The forgetting of a traffic lane (e.g., because no lane marking is acquired any longer) can correspondingly also be asymmetrical, i.e., the traffic lane that was previously determined on the basis of a solid lane marking is retained for longer than a traffic lane that was determined on the basis of a dashed lane marking.

The evaluation unit 3 is furthermore designed such that learned surroundings are not simply forgotten, which is to be explained with reference to a second scenario. At time t0 the motorized transportation vehicle 20 is again located on the right-hand traffic lane 11, and changes at time t3 to the central traffic lane 12. The camera 2 now acquires the dashed lane marking 15 to the right and the dashed lane marking 18 to the left. At time t3 the evaluation unit 3 thus knows that a three-lane freeway is involved. If at time t4 the transportation vehicle 20 now changes onto the left-hand traffic lane 13, the camera 2 thus acquires the dashed lane marking 18 on the right and the solid lane marking 19 on the left. It is not possible to determine at time t4 on the basis of only the data of the camera 2 whether the freeway has two or three lanes (or comprises even more traffic lanes). However, on the basis of the information at time t3, the evaluation unit 3 has noted that a three-lane freeway is involved. This can be taken account of in the trajectory planning.

The invention claimed is:

1. A method for the automated driving of a motorized transportation vehicle, by at least one camera and an evaluation unit for evaluating data acquired by the camera, the method comprising:
   acquiring lane markings by the camera;
   determining traffic lanes from the acquired lane markings;
   observing changes in the lane markings that lead to a determination of a new traffic lane over a predefined distance; and
   entering the new traffic lane only in response to the changed lane marking being acquired over the predefined distance,
   wherein the predefined distance for the entering of a traffic lane is selected by the evaluation unit to be different for a left-hand traffic lane and a right-hand traffic lane, and
   wherein, when the vehicle is traveling in a right-hand traffic lane, the predefined distance of the acquired lane markings of a traffic lane on the right is greater than the predefined distance of the acquired lane markings of a traffic lane on the left.

2. The method of claim 1, wherein the predefined distance is selected by the evaluation unit to be greater than a length of a temporary traffic lane.

3. The method of claim 1, wherein the predefined distance is selected by the evaluation unit based on the of lane marking acquired.

4. The method of claim 1, further comprising:
   observing changes in the lane markings that lead to deletion of a traffic lane over the predefined distance; and
   deleting the traffic lane only in response to the observed changed lane marking being acquired over the predefined distance.

5. The method of claim 4, wherein the predefined distance is selected by the evaluation unit based on a previously acquired lane marking.

6. The method of claim 4, wherein the predefined distance is selected by the evaluation unit based on a currently acquired lane marking.

7. The method of claim 1, wherein previously determined traffic lanes remain stored in a storage medium of the motorized transportation vehicle at a traffic lane change of the motorized transportation vehicle.

8. A device for the automated driving of a motorized transportation vehicle, the device comprising:
   at least one camera; and
   an evaluation unit for evaluating data acquired by the camera,
   wherein the camera acquires lane markings, and the evaluation unit determines traffic lanes from the data acquired by the camera,
   wherein the evaluation unit observes over a predefined distance changes in the lane markings that lead to the determination of a new traffic lane,
   wherein the new traffic lane is entered only in response to the changed lane marking being acquired over the predefined distance, and
   wherein the evaluation unit selects the predefined distance for the entering of a traffic lane to be different for a left-hand and a right-hand traffic lane, and
   wherein, when the vehicle is traveling in a right-hand traffic lane, the predefined distance of the acquired lane markings of a traffic lane on the right is greater than the predefined distance of the acquired lane markings of a traffic lane on the left.

9. The device of claim 8, wherein the evaluation unit selects the predefined distance to be greater than a length of a temporary traffic lane.

* * * * *